United States Patent
Yoshinaga et al.

(10) Patent No.: US 7,724,234 B2
(45) Date of Patent: May 25, 2010

(54) PANEL FOR DISPLAY DEVICE, AND DISPLAY DEVICE

(75) Inventors: Hideki Yoshinaga, Yokohama (JP); Satoshi Itabashi, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1273 days.

(21) Appl. No.: 11/215,975

(22) Filed: Sep. 1, 2005

(65) Prior Publication Data
US 2005/0285843 A1 Dec. 29, 2005

Related U.S. Application Data

(63) Continuation of application No. PCT/JP2005/006835, filed on Mar. 31, 2005.

(30) Foreign Application Priority Data
Apr. 1, 2004 (JP) .............................. 2004-109112

(51) Int. Cl.
*H01L 27/108* (2006.01)
*H01L 29/94* (2006.01)
*G09G 3/34* (2006.01)
*G02F 1/1343* (2006.01)
*G02F 1/136* (2006.01)

(52) U.S. Cl. .................... 345/107; 257/296; 257/532

(58) Field of Classification Search ................. 345/107, 345/84; 349/38, 39, 42, 43, 139; 257/296–313, 257/532
See application file for complete search history.

(56) References Cited

U.S. PATENT DOCUMENTS

| | | | |
|---|---|---|---|
| 3,612,758 A | 10/1971 | Evans et al. .............. 178/5.4 R |
| 6,104,370 A | 8/2000 | Nakagaki et al. ............. 345/100 |
| 6,720,577 B2 | 4/2004 | Arao et al. ..................... 257/59 |
| 6,963,084 B2 * | 11/2005 | Arao et al. ..................... 257/59 |
| 7,304,632 B2 * | 12/2007 | Kodama et al. ............. 345/100 |
| 2002/0005540 A1 * | 1/2002 | Kim et al. .................... 257/303 |
| 2002/0105040 A1 * | 8/2002 | Yamazaki et al. ........... 257/408 |
| 2004/0041761 A1 * | 3/2004 | Sugita et al. .................. 345/87 |

(Continued)

FOREIGN PATENT DOCUMENTS

JP 06-250606 9/1994

(Continued)

*Primary Examiner*—Alexander S. Beck
(74) *Attorney, Agent, or Firm*—Fitzpatrick, Cella, Harper & Scinto

(57) ABSTRACT

A panel for a display device includes an electroconductive substrate formed from an electroconductive metal material, a substrate insulating layer arranged on the electroconductive substrate, an X-direction electric wiring group and a Y-direction electric wiring group arranged on the electroconductive substrate, pixels arranged in a matrix, a TFT element for driving the pixel, and a control unit for controlling, to a predetermined potential, a substrate potential of the electroconductive substrate. The TFT element has a reverse stagger structure, with the substrate insulating layer being arranged between the electroconductive substrate and a gate electrode of the TFT element, a gate insulating layer of the TFT element is arranged between a drain electrode of the TFT element and the electroconductive substrate, and an electric capacitor is formed in a part of the substrate insulating layer between the drain electrode and the electroconductive substrate. The electric capacitor is set based on the gate insulating layer of a film thickness smaller than a thickness of the substrate insulating layer without causing insulating breakdown.

9 Claims, 5 Drawing Sheets

U.S. PATENT DOCUMENTS

2004/0196232 A1* 10/2004 Kim et al. .................. 345/89
2006/0071215 A1 4/2006 Arao et al. .................. 257/72

FOREIGN PATENT DOCUMENTS

| JP | 7-72507 | 3/1995 |
| JP | 7-92460 | 4/1995 |
| JP | 9-179106 | 7/1997 |
| JP | 9-211499 | 8/1997 |
| JP | 9-283766 | 10/1997 |
| JP | 10-56127 | 2/1998 |
| JP | 11-74452 | 3/1999 |
| JP | 11-133930 | 5/1999 |
| JP | 2000-131710 | 5/2000 |
| JP | 2001-28438 | 1/2001 |
| JP | 2002-189429 | 7/2002 |
| JP | 2003-197531 | 7/2003 |
| JP | 2003-307751 | 10/2003 |
| JP | 2004-77805 | 3/2004 |

* cited by examiner

PANEL FOR DISPLAY DEVICE, AND DISPLAY DEVICE

This application is a continuation of International Application No. PCT/JP2005/006835, filed Mar. 31, 2005, which claims the benefit of Japanese Patent Application No. 2004-109112, filed Apr. 1, 2004.

BACKGROUND OF THE INVENTION

1. Field of the Invention

The present invention relates to a display device having matrix wiring arranged on an insulated electroconductive substrate by an insulator.

2. Related Background Art

The demand for a display device which has lower power consumption and a thinner size has increased with the development of information processing devices, and research and development works for such a display device as to correspond to the demand have been actively conducted.

A display device is often used outdoors, along with increase of such mobile information processing devices as particularly so-called a wearable personal computer and an electronic note, and the reduction of a power consumption and an installation space is expected.

However, many liquid crystal displays have no so-called memory function in general, so that they have to continuously apply voltage on a liquid crystal display panel during the display. On the other hand, a liquid crystal display panel with a memory function has difficulty in sufficiently securing operational reliability, when assuming that it will be used in various environments as are wearable personal computers, so that it has not been practically used yet.

One of a thin-and-light display system with a memory function is an electrophoretic display device disclosed by Harold D. Lees (cf. U.S. Pat. No. 3,612,758).

Electrophoretic display devices of this kind comprise a pair of substrates arranged in a state of being separated by a predetermined gap, an insulating liquid filled in between a pair of the substrates, a lot of coloring chargeable electrophoretic particles dispersed in the insulating liquid, and a display electrode placed on each picture element in parallel to each substrate.

In the display device, the coloring chargeable electrophoretic particles are electrically charged into a positive polarity or a negative polarity, so that they are adsorbed to either of the display electrodes according to the polarity of voltage applied to the display electrode. For instance, between the condition of making the coloring particles adsorbed to an upper electrode to show the coloring chargeable electrophoretic particles and the condition of making the coloring chargeable electrophoretic particles adsorbed to a bottom electrode to show the color of an insulating liquid, through controlling applied voltage, the display device can display various images. Such a type of a display device is called "vertically moving type."

In addition to the above one, such a type of an electrophoretic display device is disclosed as shown in FIGS. 4A and 4B (cf. Japanese Patent Application Laid-Open No. H9-211499).

The electrophoretic display device has a different configuration from that of the above described type which has an insulating liquid arranged so as to be sandwiched by a pair of substrates, and adopts such a configuration shown in FIGS. 4A and 4B as to have, for instance, a first electrode 231 arranged under a shielding layer (a partition wall) 235 placed between picture elements, and a second electrode 232 which is arranged on the whole picture element display for reflecting incident light and is covered with an insulating film 236.

Accordingly, an insulating liquid 237 has only to be transparent. The electrophoretic display device displays a black color by covering the second electrode 232 with electrophoretic particles 238 as shown in FIG. 4A, and displays a white color by exposing the second electrode 232 through collecting the electrophoretic particles 238 to the first electrode 231 placed between the picture elements as shown in FIG. 4B. Thus, the electrophoretic display device can display images by controlling the polarity of applied voltage for every picture element.

In recent years, a display with a small thickness, hardly being damaged and having flexibility like paper, has been suggested as a display device using the above described electrophoretic method, which could not been conventionally realized. In order to follow the trend, it has been considered to form a TFT (Thin Film Transistor) back plane for driving a display element not on a glass substrate made of conventional glass, but on a comparatively thin metallic sheet or a plastic substrate made of a plastic material.

For instance, a technology is disclosed for forming a TFT back plane on a metallic substrate made of a stainless steel (SUS: Steel Use Stainless) material (cf. Japanese Patent Application Laid-Open No. H9-179106).

As described above, the metallic substrate made of a stainless steel material (SUS) is greatly different from glass materials which have been conventionally used in general and plastic materials having comparatively high flexibility in the respect of having electroconductivity.

FIG. 5 shows one example of a sectional drawing of a pixel electrode in a TFT matrix array formed on a metallic substrate.

As shown in FIG. 5, a conventional display device comprises a substrate-insulating layer 311, a gate electrode 312, a gate insulating layer 314, an amorphous silicon layer 315, an ohmic contact layer 319, a source electrode 320, a drain electrode 317 and a channel protective film 318 sequentially layered on a metallic substrate 310; and an electrode 313 for providing electrical retention capacitance (Cs) in between itself and each of a metallic substrate 310 and a drain electrode 317.

In a conventional display device with the use of a substrate made of a non-conductive material such as glass, reference character a of parasitic capacitance $C_{g\text{-}Sub}$ and reference character b1 or b2 of parasitic capacitance $C_{d\text{-}Sub}$ as shown in FIG. 5 do not exist.

In a display device with the use of an electroconductive substrate as shown in FIG. 5, $C_{g\text{-}Sub}$ of parasitic capacitance a and $C_{d\text{-}Sub}$ of parasitic capacitance b1 or b2 are produced, of which the state is equivalent to such a state that the display device has an electrically connected certain coil component. Then, a metallic substrate in a floating state of having an inconstant substrate potential inconveniently acts as an antenna, picks up noises, adversely affects a pixel circuit formed on a metallic substrate or the driving system of the pixel circuit, and causes malfunction.

In addition, a metallic substrate has a comparatively high linear expansion coefficient in comparison with an AN glass requiring no annealing treatment, which is generally used in a display unit application, and has a large fluctuation of the dimension due to a variation of a heat history in a manufacturing process. Accordingly, in the manufacturing process of a TFT matrix array in particular, the metallic substrate causes difficulty in an alignment step for adjusting the dimension of itself, and makes it difficult to cope with a high-resolution display device, which are problems.

For this reason, objects of the present invention are to provide a panel for a display device, which has an improved reliability of the drive for a pixel circuit and can cope with a high-resolution image, and to provide the display device therefor.

SUMMARY OF THE INVENTION

In order to achieve the above described objects, a panel for a display device according to the present invention, which is provided with an electroconductive substrate, an X-direction electric wiring group and a Y-direction electric wiring group arranged on the electroconductive substrate, and pixels arranged in the matrix shape, has control means for controlling the substrate potential of an electroconductive substrate to a predetermined potential.

A panel for a display device according to the present invention configured as described above has an electroconductive substrate of which the substrate potential is electrically fixed or controlled into a predetermined potential, and consequently can control the amount of electric charge stored in capacitors between the electroconductive substrate and each of an X-direction electric wiring group and a Y-direction electric wiring group, to a predetermined value. Accordingly, the panel for the display device according to the present invention has an improved grade of the gradation of images resulting from a variation of a capacitance between an electroconductive substrate, and an X-direction electric wiring group and a Y-direction electric wiring group, and acquires an improved reliability of a display operation.

In addition, a display device according to the present invention has the above described panel for the display device according to the present invention, and driving means for driving an X-direction electric wiring group and a Y-direction electric wiring group.

In addition, another display device according to the present invention has a matrix array substrate having a scan electrode and an information electrode wired into a matrix shape on a substrate-insulating layer installed on a conductive substrate; driving means having first means for driving the scan electrode and second means for driving the information electrode; a second substrate arranged so as to face the matrix array substrate; a pair of electrodes of which one electrode is arranged at least on either substrate of the matrix array substrate and the second substrate; and an optical modulation element arranged in between the matrix array substrate and the second substrate; wherein the matrix array substrate and the electrode provide electrical capacitance between them.

Other features and advantages of the present invention will be apparent from the following description taken in conjunction with the accompanying drawings, in which like reference characters designate the same or similar parts throughout the figures thereof.

The accompanying drawings, which are incorporated in and constitute a part of the specification, illustrate embodiments of the invention and, together with the description, serve to explain the principles of the invention.

DESCRIPTION OF THE PREFERRED EMBODIMENTS

The preferred embodiments according to present invention will be described in detail below with reference to drawings.

First Embodiment

Figure 2A:
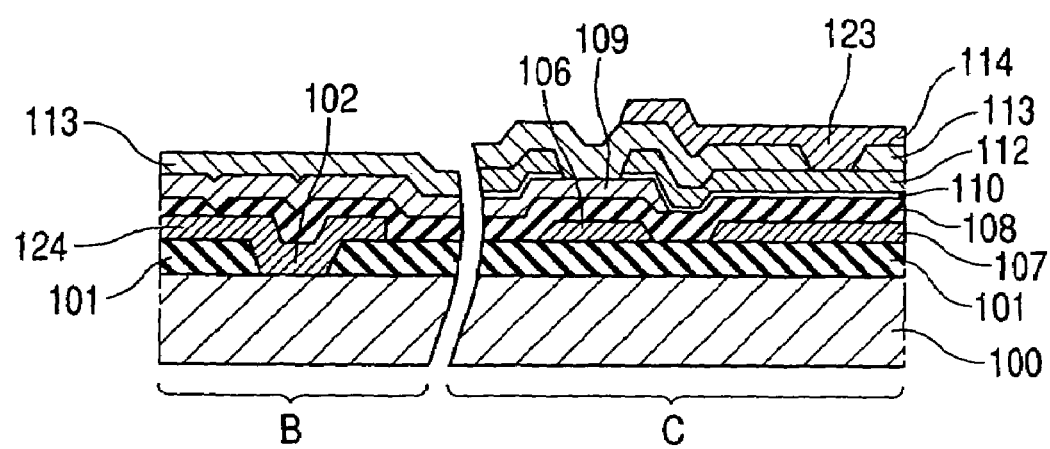
FIGS. 2A and 2B are schematic diagrams showing the essential part of the above described display panel.
Figure 2B:
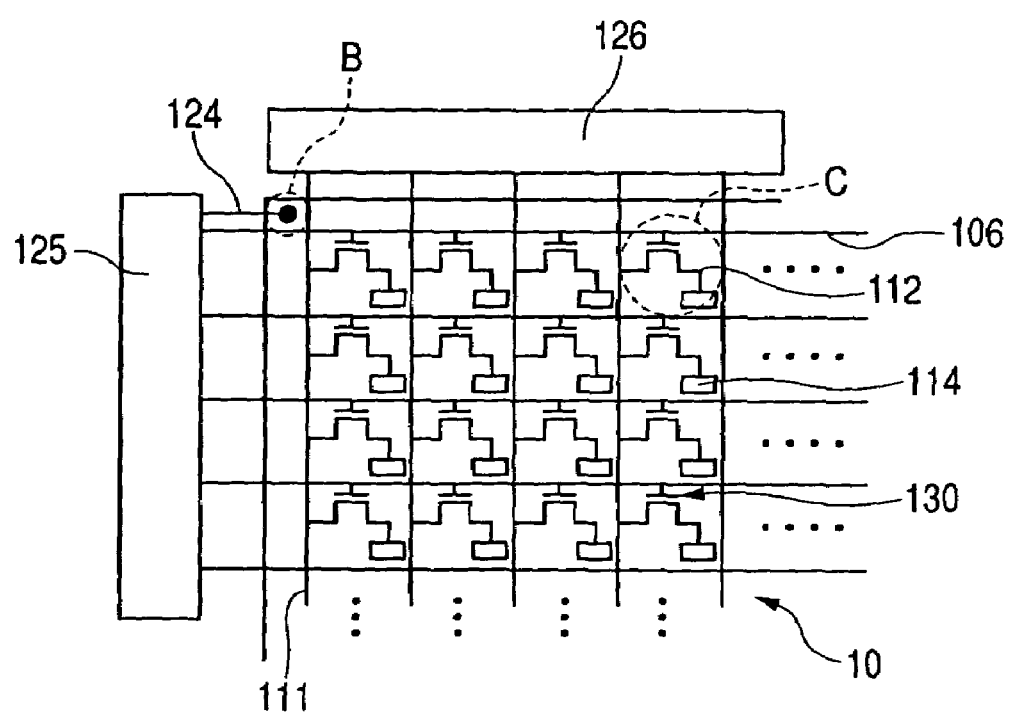

FIG. 2A shows a schematic sectional view of an electrophoretic type of a display device according to the present embodiment. FIG. 2B shows a schematic block diagram of one part of a TFT active matrix array having 300 rows×250 columns according to the present embodiment. Parts B and C in the FIG. 2A correspond to the sectional views of parts B and C in the FIG. 2B.

A thin display panel 10 according to the present embodiment, which constitutes one part of a display device, as shown in FIGS. 2A and 2B, includes a metallic substrate 100 having electroconductivity; an X-direction electric wiring group, or equivalently, a gate wiring group connected to gate electrodes 106 that are scan electrodes, a Y-direction electric wiring group, or equivalently, a source wring group connected to source electrodes 111 that are information electrodes, and pixel electrodes arranged into a matrix shape, such as pixel electrodes 114 arranged in each intersecting point of a gate electrode 106 group with a source electrode 111 group arranged into the matrix shape, which are all disposed on the metallic substrate 100; and further a gate line-driving circuit 125 and a source line-driving circuit 126 for driving respectively the gate electrode 106 group and the source electrodes 111 group.

Gate line-driving voltage for a gate line-driving circuit 125 is set so as to have, for instance, the on-state voltage of (+)20 V and the off-state voltage of (−)20 V, and source line-driving voltage for a source line-driving-circuit 126 is set to, for instance, 0 to 15 V. In addition, as shown in FIG. 2B, a TFT 130 is arranged to each picture element.

A detailed configuration of a display panel will be now described according to a process for manufacturing a display panel.

A metallic substrate 100 as an electroconductive substrate is made of a metallic material having electroconductivity such as a SUS material, and is formed into a sheet with the thickness of about 0.2 mm.

Then, a substrate-insulating layer 101 is formed on a metallic substrate 100, and the substrate-insulating layer 101 is selectively etched to prepare a contact hole 102 through which a metallic substrate 100 can be electrically connected.

Subsequently, on a substrate-insulating layer 101, a wiring is formed to electrically connect a metallic substrate 100 with at least either one of a gate electrode 106, a source electrode 111 and a drain electrode 112. Controlling means consisting of such a configuration enables the potential of a metallic substrate 100 to be controlled.

A method for forming electric wiring will not be described in detail, but includes, for instance, forming a conducting layer by vapor-depositing Al having comparatively low resistivity through a sputtering technique, or when there is a process of heating the substrate at a temperature exceeding the melting point of Al in the later process, by vapor-depositing Cr, Ta and Al—Nd. Subsequently, a photoresist is applied on the conducting layer, then the photoresist is selectively exposed and developed, and the conducting layer is patterned by etching into a predetermined geometry to form wiring. Furthermore, when a TFT (Thin Film Transistor) of a bottom gate structure (a reverse stagger type) is used for instance, gate wiring connected to a gate electrode 106 is formed.

Subsequently, as shown in FIGS. 2A and 2B, an insulating layer 108 is formed in order to insulate a gate electrode 106; then, for instance, an amorphous semiconductor layer 109 is formed; an ohmic contact layer 110 is formed, for instance, with ion implantation; one part of this ohmic contact layer 110 is selectively removed; and a drain electrode 112 and a source electrode 111 are formed.

A display panel 10 according to the present embodiment has a structure of providing a substrate-insulating layer 101 on a metallic substrate 100 that is a thin sheet made of an electroconductive material, where a metallic substrate 100 is electrically connected to a power source having a predetermined potential (also including a ground potential), in order to control the substrate potential of itself. Thereby, an electric charge stored in a capacitor formed between the metallic substrate 100 and an electrode arranged on the substrate-insulating layer 101 on the metallic substrate 100 can be controlled into a constant value.

In the next place, a display panel 10 according to the present embodiment will be described further in detail.

Figure 1A:
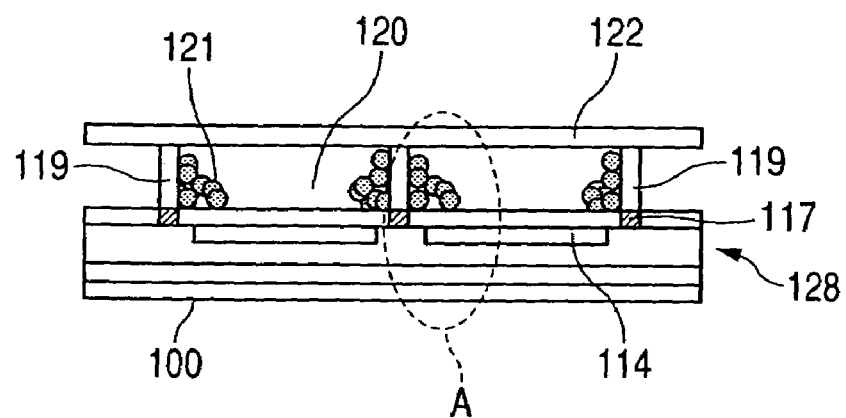
FIGS. 1A and 1B are sectional views showing the structure of a display panel according to the first embodiment.
Figure 1B:
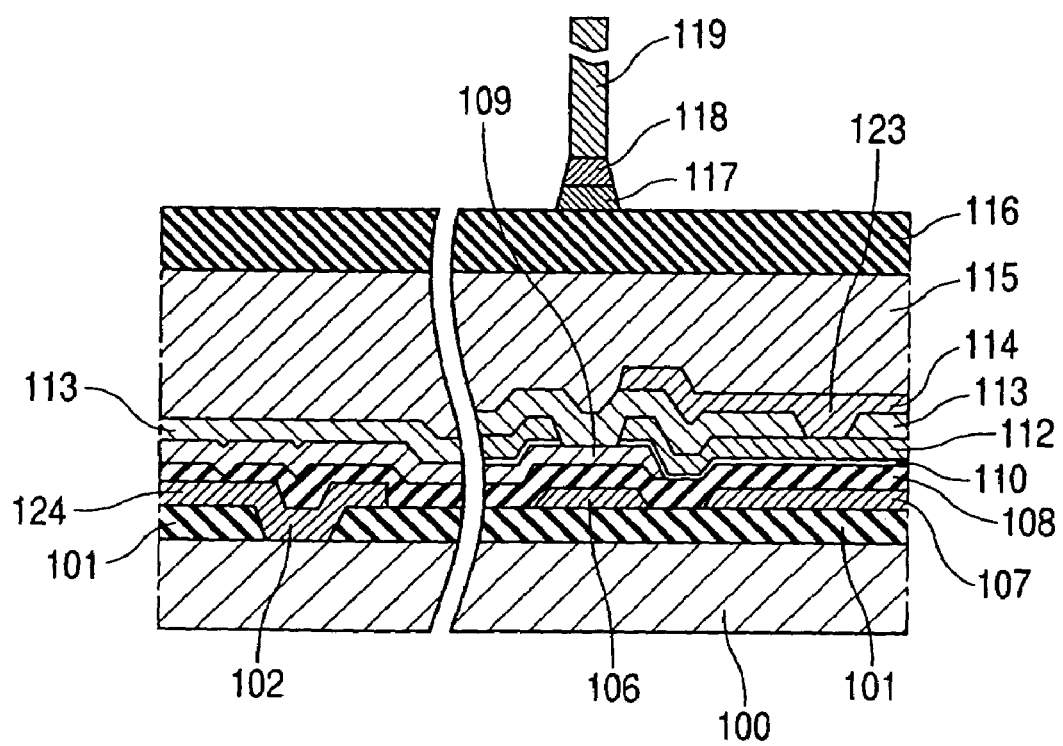

FIG. 1A is a sectional view schematically showing a display picture element which uses electrostatic particles 121 of an electrophoretic display element, and has a TFT back plane with the use of a metallic substrate made of an electroconductive material, in order to drive the electrostatic particles 121. FIG. 1B shows an enlarged sectional view of a part A in FIG. 1A.

Each step before forming a TFT matrix array including each picture element on a metallic substrate 100 having electroconductivity will be described below with reference to FIGS. 1A and 1B.

1) On a metallic substrate 100 having the sheet thickness of 0.2 mm, a SiN film is formed into the thickness of 300 nm with a CVD (Chemical Vapor Deposition) process to form a substrate-insulating layer 101.

2) A contact hole 102 is formed on a substrate-insulating layer 101 with a dry etching process to expose one part of a metallic substrate 100.

3) An Al—Nd film is formed on a substrate-insulating layer 101 into the thickness of 200 nm with a sputtering technique, and a gate electrode 106 and pixels capacitance-forming electrode (Cs wiring) 107 are each formed by using a photomask. Here, because an electrophoretic type display panel according to the present embodiment requires retention capacitance for retaining and driving a TFT 130, the picture element capacitance-forming electrode 107 is formed on the same layer as the gate electrode 106.

In the above step, a substrate potential-controlling wiring 124 for controlling the substrate potential of a part electrically connected with a metallic substrate 100 is also formed through a contact hole 102. A substrate potential-controlling wiring 124 is formed so as to give the substrate the same potential as a Vcom potential which is a reference potential of an electrode electrically opposing to a pixel electrode 114 of the display panel 10, when a gate line-driving circuit 125 and a source line-driving circuit 126 will be mounted in a later process. Here, Vcom is voltage applied to a Ti layer 117, and "opposing" means relations including both of parallel plates layered in a vertical direction and an in-plane type (for instance, in FIG. 1B) formed on the approximately same plane so as to face each other.

4) A SiN film is formed into the thickness of 250 nm as a gate insulating layer 108 on a gate electrode 106 with a CVD process, and then a-Si film is formed into the thickness of 200 nm as an amorphous semiconductor layer 109 with the CVD process.

5) An a-Si (n+) film is formed into the thickness of 20 nm as an ohmic contact layer 110 with a CVD process.

6) An Al film is formed into the thickness of 200 nm on an ohmic contact layer 110 with a sputtering technique.

7) An Al film is wet-etched by using a photomask, and a source electrode 111, a drain electrode 112, and source electric wiring and drain wiring connected with them are each formed. Subsequently, by a dry etching method with the use of the same resist pattern, an ohmic contact layer 110 in a TFT channel part is removed, and a SiN film 113 is formed into the thickness of 300 nm.

8) A SiN film 113 is dry-etched to produce a contact hole 123 as shown in FIG. 1B and expose one part of a drain electrode 112.

9) An Al film is formed on a SiN film 113 into the thickness of 200 nm with a sputtering technique.

10) By wet etching an Al film with the use of a photomask, a pixel electrode 114 is formed.

11) An acrylic resin containing TiO$_2$ is applied to form a white scattering layer 115 with the thickness of 4 μm.

12) On the white scattering layer 115, an acrylic resin film is formed into the thickness of 1 μm as an insulating layer 116.

13) A Ti layer 117 is formed on an insulating layer 116 into the thickness of 300 nm, and a first photoresist layer 118 containing carbon is further formed thereon into the thickness of 300 nm.

14) Subsequently, the second photoresist layer is formed on the photoresist layer 118 into the thickness of 15 μm, and then is developed and removed while leaving a boundary part between picture elements, so as to form a partition wall 119 between picture elements by itself.

15) A Ti layer 117 and a photoresist layer 118 are etched with the use of the partition wall 119 formed of the second photoresist layer to form a TFT back plane 128.

16) In the final step, a dispersion liquid containing black electrostatic particles 121 made of a polystyrene resin containing carbon black dispersed in an insulating liquid 120 containing a paraffin-based hydrocarbon solvent as a main component is filled in a space partitioned by the partition wall 119 as an optical modulation element, and a transparent second substrate 122 is fixed on the partition wall 119 with an adhesive (not shown).

A display panel 10 according to the first embodiment has contact holes 102 arranged in a substrate-insulating layer 101 on a metallic substrate 100, so that the substrate potential of the metallic substrate 100 can have the same potential as a Vcom potential which is a reference potential of an electrode electrically opposing to a pixel electrode 114 in the display panel 10; or alternatively the same potential as a drain electrode when the metallic substrate 100 is connected to a drain electrode. Furthermore, the display panel 10 has a TFT active matrix formed on a substrate-insulating layer 101, has a retention capacitance formed between a metallic substrate 100 having electroconductivity and a drain electrode 112 disposed in a TFT active matrix array formed on the substrate-insulating layer 101 or an electrode (not shown) having the same potential as the drain electrode 112, and thereby keeps the potential of the metallic substrate 100 constant.

As described above, a display panel 10 according to the present embodiment has a retention capacitance formed between a metallic substrate 100 and a drain electrode 112 or an electrode (not shown) having the same potential as the drain electrode 112, thereby prevents the substrate potential of the metallic substrate 100 from varying, consequently improves the gradation failure of displayed images to provide adequate images, and can improve the reliability of a display operation.

In addition, when a display panel 10 according to the present embodiment is manufactured, the operation of positioning a gate electrode 106 in a process for manufacturing a TFT matrix array is easy, even when a metallic substrate having a comparatively high linear expansion coefficient is used, so that the display panel 10 can cope with high resolution images.

Second Embodiment

Figure 3A:
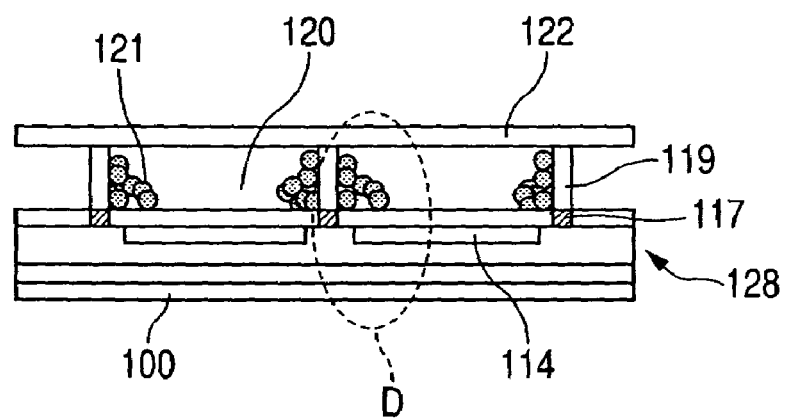
FIGS. 3A and 3B are sectional views showing the structure of a display panel according to the second embodiment.
Figure 3B:
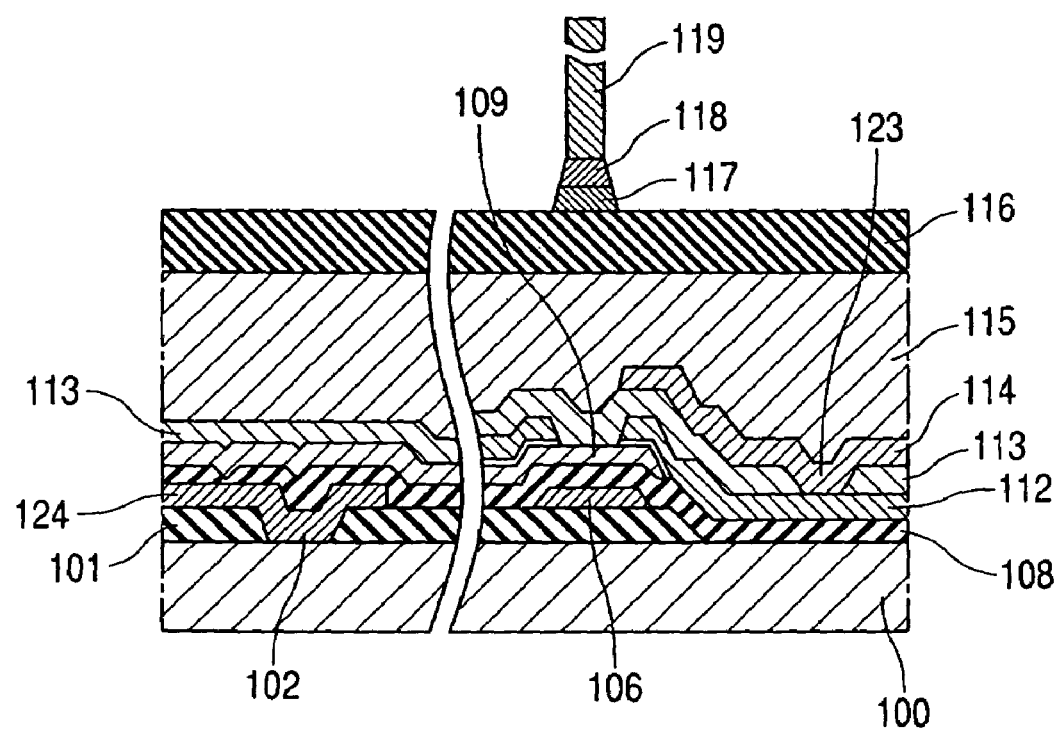
Figure 4A:
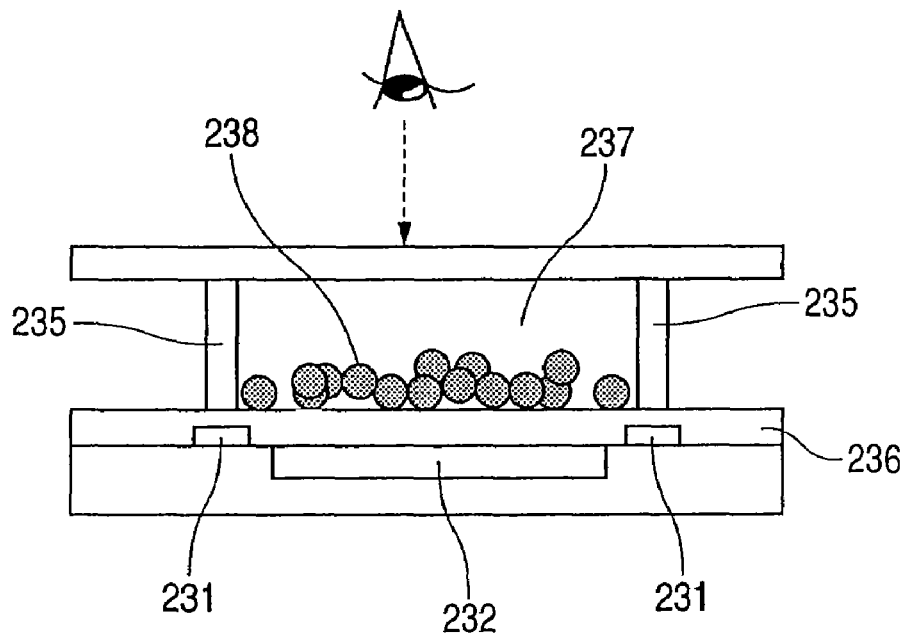
FIGS. 4A and 4B are sectional views showing a conventional electrophoretic display device.
Figure 4B:
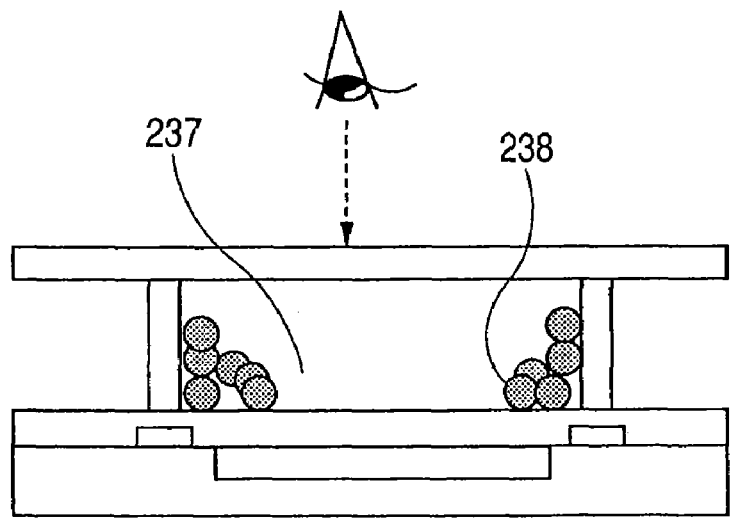
Figure 5:
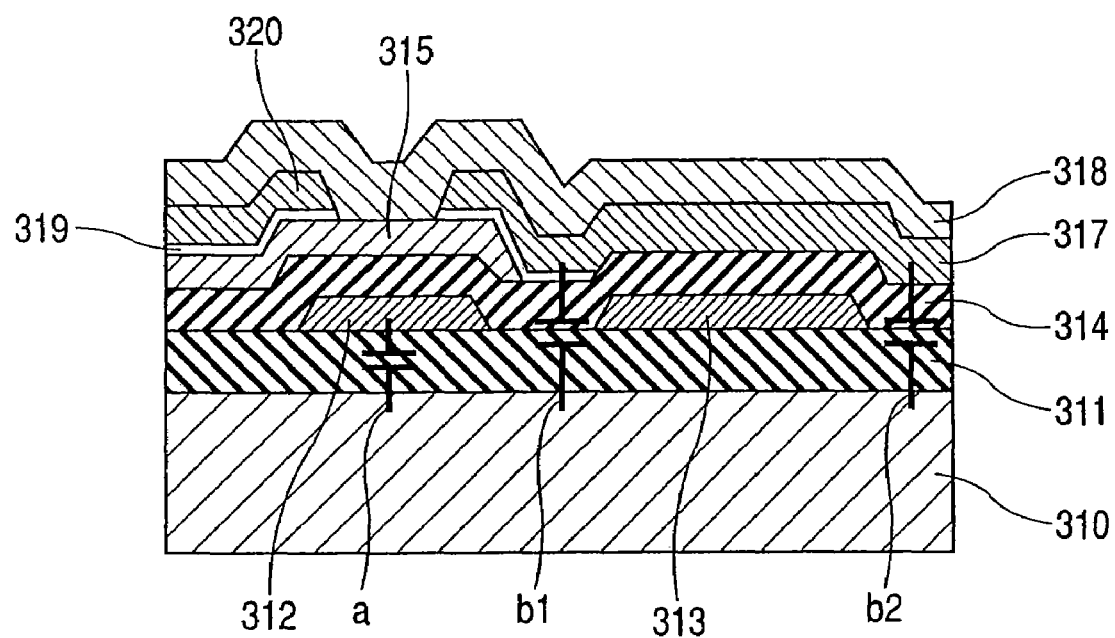
FIG. 5 is a sectional view showing one example of the structure of a metallic substrate and each layer provided in a conventional display device.

A display panel according to the second embodiment will be described in detail with reference to drawings. FIG. 3A shows a schematic sectional view of a display device according to the present embodiment. FIG. 3B shows an enlarged sectional view of a part (D) in FIG. 3A.

A display panel according to the present embodiment also employs electrostatic particles 121 of an electrophoretic display element, similarly to the first embodiment, and has a TFT back plane 128 with the use of a metallic substrate 100 made of an electroconductive material, in order to drive the electrostatic particles 121.

Each step before forming a TFT matrix array including each picture element on a metallic substrate 100 having electroconductivity will be described below.

1) On a metallic substrate 100 having the sheet thickness of 0.2 mm, a SiN film is formed into the thickness of 300 nm with a CVD process to form a substrate-insulating layer 101.

2) A contact hole 102 is formed as shown in FIGS. 3A and 3B, on a substrate-insulating layer 101 with a dry etching process to expose one part of a metallic substrate 100. A region in which a drain electrode 112 will be formed in a later process is also dry etched to expose one part of the metallic substrate 100.

3) An Al—Nd film is formed on a substrate-insulating layer 101 into the thickness of 200 nm with a sputtering process, and the Al—Nd film wet-etched with the use of a photomask (not shown) to form a gate electrode 106. At the same time, substrate potential-controlling wiring 124 is formed for the purpose of controlling the potential of a part electrically connected to a metallic substrate 100 through a contact hole 102. The substrate potential-controlling wiring 124 is formed so as to give the substrate the same potential as a Vcom potential of a reference potential of an electrode electrically opposing to the pixel electrode 114 of a display panel 10, when a gate line-driving circuit 125 and a source line-driving circuit 126 would be mounted in a later process.

4) A SiN film is formed into the thickness of 250 nm as a gate insulating layer 108 on a gate electrode 106 with a CVD process, and then a-Si film is formed into the thickness of 200 nm as an amorphous semiconductor layer 109 with the CVD process.

5) An a-Si (n+) film is formed into the thickness of 20 nm as an ohmic contact layer 110 with a CVD process.

6) An Al film is formed into the thickness of 200 nm on an ohmic contact layer 110 with a sputtering technique.

7) An Al film is wet-etched by using a photomask, and a source electrode 111, a drain electrode 112, and a source electric wiring and a drain wiring connected with them are each formed. Subsequently, by a dry etching method with the use of the same resist pattern, the ohmic contact layer 110 in a TFT channel part is removed, and a SiN film 113 is formed into the thickness of 300 nm.

8) A SiN film 113 is dry-etched to produce a contact hole 123 as shown in FIGS. 3A and 3B and expose one part of a drain electrode 112.

9) An Al film is formed on a SiN film 113 into the thickness of 200 nm with a sputtering technique.

10) An Al film is wet etched with the use of a photomask to form a pixel electrode 114.

11) An acrylic resin containing $TiO_2$ is applied to form a white scattering layer 115 with the thickness of 4 µm.

12) On the white scattering layer 115, an acrylic resin film is formed into the thickness of 1 µm as an insulating layer 116.

13) A Ti layer 117 is formed on an insulating layer 116 into the thickness of 300 nm, and a first photoresist layer 118 containing carbon is further formed thereon into the thickness of 300 nm.

14) The second photoresist layer is formed on the photoresist layer 118 into the thickness of 15 µm, and then is developed and removed while leaving a boundary part between picture elements, so as to form a partition wall 119 between picture elements by itself.

15) A Ti layer 117 and a photoresist layer 118 are etched with the use of the partition wall 119 formed of the second photoresist layer to form a TFT back plane 128.

16) In the final step, a dispersion liquid containing black electrostatic particles 121 made of a polystyrene resin containing carbon black dispersed in an insulating liquid 120 containing a paraffin hydrocarbon solvent as a main component is filled in a space partitioned by the partition wall 119, and a transparent second substrate 122 is fixed on the partition wall 119 with an adhesive (not shown).

In the present embodiment as well a substrate-insulating layer 101 on a metallic substrate 100 has a contact hole 102 arranged therein, so that the substrate potential of the metallic substrate 100 can be the same potential as a Vcom potential which is a reference potential of an electrode electrically opposing to a pixel electrode 114 in a display panel 10.

Furthermore, in the present embodiment, a contact hole 102 for controlling a substrate potential and a region for forming a drain electrode 112 therein in a substrate-insulating layer 101 formed on a metallic substrate 100 are etched, and wiring (not shown) for controlling the substrate potential is provided there in the step of forming a gate electrode 106. In addition, in the region for forming a drain electrode 112 therein, a metallic substrate 100 is insulated by a gate insulating layer 108, and a drain electrode 112 is formed in a later process.

In a conventional display panel, when retention capacitance is formed, a first electrode for providing the capacitance has been formed into an arbitrary shape in a layer, and a second electrode for providing the capacitance has been formed into an arbitrary shape in the other layer so as to sandwich an insulating layer between both electrodes. Accordingly, if a first electrode and a second electrode are relatively misaligned, the capacitance of a formed picture element varies to cause variations. As one of a measure for preventing such a variation of picture element capacitance, there has been a method of forming a first electrode and a second electrode so that either of them can be larger than the other to arrange an unsymmetric part in the area of the electrode. Thus, the variation of retained capacitance has been reduced even if the electrodes have been misaligned.

In contrast to this, in the present invention, a first electrode for providing capacitance is a metallic substrate itself, and an insulating layer and a second electrode for providing the capacitance are formed on the metallic substrate 100, so that the second electrode can be very easily positioned, in comparison with the method of positioning the first and second electrodes as in the conventional method. In addition, the electrical capacitance is determined by the area of the second electrode and consequently by only the accuracy of the size of the second electrode, so that the variation of the electrical capacitance can be easily reduced.

To sum up, a display panel according to the present embodiment consequently makes an electrode opposing to the drain electrode 112 the whole metallic substrate 100 having electroconductivity as is shown in FIG. 3B, so that it does not need the highly precise positioning for the electrode opposing to the drain electrode 112. Accordingly, display panel according to the present embodiment can determine the capacitance of pixels by only the area of the drain electrode 112, can provide a wide design margin, and can be more freely designed.

Furthermore, a display panel according to the present embodiment has such a configuration for providing retention capacitance as to comprise a metallic substrate 100, a substrate-insulating layer 101 on the metallic substrate 100, and a drain electrode 112 formed on one part of each insulating layer placed between the region for arranging the drain electrode 112 therein and the metallic substrate 100, the one part having been selectively removed; and thereby, facilitates an operation for positioning a gate electrode 106 and a drain electrode 112, even when a TFT matrix array is manufactured with the use of a metallic substrate 100 made of a material having a comparatively high linear expansion coefficient. As a result, the display panel has an alleviated request value for the positioning accuracy, acquires an increased capacitance for retaining the voltage of pixels without changing a capacitance between a metallic substrate 100 and each driving electrode, and thereby can cope with higher-resolution images.

One factor for determining the thickness of an insulating film of a substrate-insulating layer 101 formed on a metallic substrate 100 includes the parasitic capacitance of a gate electrode 106. The retention capacitance for pixels in the configuration of the present embodiment is determined so as not to decrease driveability even when the parasitic capacitance of the gate electrode 106 is increased, while considering the insulation characteristics of a gate insulating layer 108.

Specifically, the retention capacitance for pixels is determined while considering each of the influence of the parasitic capacitance of a gate electrode 106 on driveability; the film thickness of a gate insulating layer 108, which is determined not so as to cause the dielectric breakdown of the gate insulating layer 108 and is thinner than that of a substrate-insulating layer 101; and the area of the gate electrode 106. When a retention capacitance for pixels is thus determined, a manufactured display panel can acquire further improved resolution, and a display panel manufactured even with the use of the metallic substrate 100 having electroconductivity can have an adequate picture quality.

In this embodiment, in order to electrically connect with a metallic substrate 100, one part of a substrate-insulating layer 101 was removed by etching to expose the metallic substrate 100, and in the exposed part, an electrode for connecting to the metallic substrate 100 was formed. But for instance, the exposed part of the metallic substrate 100 having no substrate-insulating layer 101 thereon can be electrically connected through wiring with the use of solder or the like.

A display panel in the present embodiment is configured as the TFT back plane of an electrophoretic type of a display panel, but is not limited thereto, and can be applied, for instance, to a reflecting liquid-crystal display panel. When applied to a reflecting liquid-crystal display panel, the display panel can display images by forming a transparent electroconductive film such as an ITO (Indium Tin Oxide) film on a second substrate 122 to make it a common electrode (a counter electrode), sandwiching a liquid crystal between the common electrode and a drain electrode, and applying a predetermined electric field between the drain electrode and the common electrode.

In addition, the display panel in the present embodiment adopts a so-called reverse stagger structure by using amorphous silicon, specifically using the configuration of a bottom-gate type in which a gate electrode 106 is arranged in the lower part of a gate insulating layer 108 (a SiN film), but can adopt, for instance, a top gate structure without any problem. Then, the display panel provides a similar effect and can provide electrical capacitance by using a metallic substrate and a substrate-insulating layer. Accordingly, the present invention is not limited to the configuration of the present embodiment.

In addition, a TFT to be used in the display panel is not limited to the one which employs amorphous silicon as an active layer, but even when the display panel employs, for instance, a polysilicon TFT having the active layer formed of polysilicon made by annealing amorphous silicon with laser, or a TFT transferred onto a substrate from a monocrystal TFT by using a transferring technique, the display panel can provide a similar effect.

In addition, in the present embodiment, a metallic substrate 100 was electrically connected to an electrode electrically opposing to a pixel electrode 114, which has a Vcom voltage of a reference potential, and the Vcom voltage of the present embodiment had an approximately constant potential, so that the substrate potential of the metallic substrate 100 had also an approximately constant value.

However, the display panel can be applied to a so-called common-inversion driving type in which a reference potential is changed on each writing frame, without any problem. When used in the above type, as in the present embodiment, the substrate potential can be equalized to a Vcom potential by electrically connecting a metallic substrate with an electrode having a Vcom potential, or the substrate potential of a metallic substrate may be controlled by a power source other than the one used for a Vcom electrode to make itself approximately equal to the Vcom potential of the reference potential.

In addition, a display panel according to the present invention may employ any panel driving system among, for instance, a dot-inversion drive for reversing the polarity of voltage applied between adjacent pixel electrodes, a vertical line inversion drive for reversing the polarity of voltage applied to the pixel electrodes with respect to each adjacent signal line (an information electrode), a horizontal line inversion drive for reversing the polarity of a voltage applied to each pixel electrode with respect to each adjacent scanning line (a scan electrode), and a frame inversion drive for reversing the polarity of a voltage applied to the pixel electrodes with respect to every one frame period. When such a drive system is adopted and a common electrode potential is modulated in order to reverse the polarity of the applied voltage, the substrate potential of a metallic substrate shall be controlled to synchronize with the modulation of the common electrode potential so that a potential difference between the substrate potential of the metallic substrate and the common electrode potential can be always approximately constant. To be more specific, the common electrode is controlled by modulating power supply voltage or switching output. An electroconductive substrate is electrically connected to the common electrode, so that it necessarily has a constant or approximately constant value with respect to the common electrode potential.

Finally, the above described electrophoretic type display panel has such flexibility as to follow some extent of bending, so that it is preferably used for an application replaceable with a paper medium for instance, or the display panel of information processing equipment such as a personal digital assistant (PDA).

This application claims priority from Japanese Patent Application No. 2004-109112 filed on Apr. 1, 2004, which is hereby incorporated by reference herein.

What is claimed is:

1. A panel for a display device, comprising:
an electroconductive substrate formed from an electroconductive metal material;
a substrate insulating layer arranged on the electroconductive substrate;
an X-direction electric wiring group and a Y-direction electric wiring group arranged on the electroconductive substrate;
pixels arranged in a matrix;
a TFT element for driving the pixel; and
a control unit for controlling, to a predetermined potential, a substrate potential of the electroconductive substrate, wherein
the TFT element has a reverse stagger structure, with the substrate insulating layer being arranged between the electroconductive substrate and a gate electrode of the TFT element,
a gate insulating layer of the TFT element is arranged between a drain electrode of the TFT element and the electroconductive substrate,
an electric capacitor is formed in a part of the substrate insulating layer between the drain electrode and the electroconductive substrate, and
the electric capacitor is set based on the gate insulating layer of a film thickness smaller than a thickness of the substrate insulating layer without causing insulating breakdown,
wherein the control unit is electrically connected to the electroconductive substrate through a contact hole formed in the substrate insulating layer.

2. The panel for the display device according to claim 1, wherein the control unit maintains the substrate potential of the electroconductive substrate approximately constant.

3. The panel for the display device according to claim 1, wherein the electrical capacitance retains image information.

4. The panel for the display device according to claim 1, wherein the electroconductive substrate is electrically connected to any one of a source electrode, the drain electrode and the gate electrode of the TFT element, and a substrate potential control wiring for supplying the predetermined potential.

5. The panel for the display device according to claim 1, wherein the TFT element has an active layer formed from one selected from an amorphous silicon, a poly silicon, and a transferred single crystalline semiconductor.

6. A display device, comprising:
an electroconductive substrate formed from an electroconductive metal material;
a substrate insulating layer arranged on the electroconductive substrate;
an X-direction electric wiring group and a Y-direction electric wiring group arranged on the electroconductive substrate;
pixels arranged in a matrix;
a TFT element for driving the pixel;
a control unit for controlling, to a predetermined potential, a substrate potential of the electroconductive substrate, wherein
the TFT element has a reverse stagger structure, with the substrate insulating layer being arranged between the electroconductive substrate and a gate electrode of the TFT element,
a gate insulating layer of the TFT element is arranged between a drain electrode of the TFT element and the electroconductive substrate,
an electric capacitor is formed in a part of the substrate insulating layer between the drain electrode and the electroconductive substrate, and
the electric capacitor is set based on the gate insulating layer of a film thickness smaller than a thickness of the substrate insulating layer without causing insulating breakdown;
a driving unit for driving the X-direction wiring group and the Y-direction wiring group;
a power source for supplying the predetermined potential;
a second substrate arranged in opposition to the panel for the display device; and
an optical modulating element arranged between the panel for the display device and the second substrate,
wherein the control unit is electrically connected to the electroconductive substrate through a contact hole formed in the substrate insulating layer.

7. The display device according to claim 6, wherein the substrate potential of the electroconductive substrate is made equal with an electric potential of the driving unit.

8. The display device according to claim 7, wherein when polarity of a voltage applied to the pixels is reversed in any method of a dot inversion drive, a vertical line inversion drive, a horizontal line inversion drive, and a frame inversion drive, with the use of the driving unit, by modulating a common electrode potential, the substrate potential of the electroconductive substrate is synchronized with the modulated common electrode potential, and is controlled so that a potential difference between the substrate potential and the common electrode potential can be always approximately constant.

9. The display device according to claim 6, wherein the optical modulation element has electrophoretic particles and a medium in which the electrophoretic particles are dispersed therein.

* * * * *